(12) United States Patent
Kumar et al.

(10) Patent No.: US 10,958,842 B2
(45) Date of Patent: Mar. 23, 2021

(54) METHOD OF DISPLAYING IMAGES IN A MULTI-DIMENSIONAL MODE BASED ON PERSONALIZED TOPICS

(71) Applicant: Samsung Electronics Co., Ltd., Suwon-si (KR)

(72) Inventors: Raushan Kumar, Gaya (IN); Viswanath Gopalakrishnan, Bangalore (IN); Biplab Chandra Das, Bangalore (IN); Kiran Nanjunda Iyer, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 108 days.

(21) Appl. No.: 15/708,550

(22) Filed: Sep. 19, 2017

(65) Prior Publication Data

US 2018/0084198 A1    Mar. 22, 2018

(30) Foreign Application Priority Data

Sep. 19, 2016    (IN) .............................. 201641031898
Apr. 5, 2017    (IN) .............................. 201641031898

(51) Int. Cl.
  *H04N 5/232*    (2006.01)
  *H04N 1/00*    (2006.01)
  (Continued)

(52) U.S. Cl.
  CPC ..... *H04N 5/232933* (2018.08); *G06F 3/0482* (2013.01); *G06F 3/04847* (2013.01); *G06F 3/04883* (2013.01); *G06F 3/04886* (2013.01); *G06F 16/54* (2019.01); *G06F 16/65* (2019.01); *G06K 9/00684* (2013.01); *G06K 9/6253* (2013.01); *G06K 9/6267* (2013.01); *H04N 1/00411* (2013.01); *H04N 1/00453* (2013.01); *H04N 1/32128* (2013.01); *H04N 2101/00* (2013.01); *H04N 2201/3247* (2013.01)

(58) Field of Classification Search
  CPC ............ G06F 16/48–787; G06F 3/048–04897; G06K 9/6267–6287; G06K 9/00335–00355; G06K 9/00684; G06K 9/00697; G06K 9/00704; H04N 5/23293–232945; H04N 1/32128–32138; H04N 2101/00; H04N 2201/0084; H04N 1/0044–00453
  See application file for complete search history.

(56) References Cited

U.S. PATENT DOCUMENTS

| | | | |
|---|---|---|---|
| 6,996,782 B2 * | 2/2006 | Parker ..................... | G06F 16/58 715/764 |
| 7,788,592 B2 * | 8/2010 | Williams ................ | G06F 16/58 715/764 |

(Continued)

FOREIGN PATENT DOCUMENTS

WO    2014197216 A1    12/2014

*Primary Examiner* — Paul M Berardesca
(74) *Attorney, Agent, or Firm* — Jefferson IP Law, LLP

(57) ABSTRACT

A method and an electronic device for displaying images in a multi-dimensional mode based on personalized topics are provided. The method includes generating a plurality of personalized topics based on a plurality of images stored in the electronic device across a predetermined time period, and displaying the plurality of personalized topics along a timeline.

20 Claims, 15 Drawing Sheets

(51) Int. Cl.
*G06K 9/00* (2006.01)
*G06K 9/62* (2006.01)
*G06F 3/0488* (2013.01)
*G06F 16/65* (2019.01)
*G06F 3/0482* (2013.01)
*G06F 3/0484* (2013.01)
*G06F 16/54* (2019.01)
*H04N 1/32* (2006.01)
*H04N 101/00* (2006.01)

(56) References Cited

U.S. PATENT DOCUMENTS

| | | | |
|---|---|---|---|
| 2002/0075322 A1* | 6/2002 | Rosenzweig | G06F 3/0481 |
| | | | 715/835 |
| 2008/0022199 A1* | 1/2008 | Sako | G06F 16/54 |
| | | | 715/273 |
| 2008/0133526 A1 | 6/2008 | Haitani et al. | |
| 2009/0070669 A1* | 3/2009 | Hirota | G11B 27/326 |
| | | | 715/700 |
| 2010/0077333 A1* | 3/2010 | Yang | G06F 3/0486 |
| | | | 715/769 |
| 2012/0170075 A1* | 7/2012 | Minamino | H04N 1/00175 |
| | | | 358/1.15 |
| 2014/0079322 A1 | 3/2014 | Yamaji et al. | |
| 2014/0282011 A1* | 9/2014 | Dellinger | G06F 3/0482 |
| | | | 715/731 |
| 2016/0110046 A1* | 4/2016 | Yao | G06F 3/04883 |
| | | | 715/784 |
| 2016/0140146 A1* | 5/2016 | Wexler | G06K 9/4604 |
| | | | 707/741 |
| 2016/0203386 A1 | 7/2016 | Porecki et al. | |
| 2016/0253564 A1 | 9/2016 | Jeong et al. | |
| 2017/0352380 A1* | 12/2017 | Doumbouya | G06F 3/0482 |

\* cited by examiner

| IMAGES | ASSOCIATED TAG |
|---|---|
| I1 | ALAN,ALICE,SUSAN,PLAY,PARK |
| I4 | ALAN,ROAD,BIKE |
| I7 | ALAN,ROAD,BIKE |
| I8 | ALAN,ROAD,BIKE |
| I6 | MOUNTAIN.GREEN,NATURE,GRASS |

| IMAGES | PERSONALIZED TOPIC |
|---|---|
| I1, I2, I7, I5 | ALAN PLAYING WITH ALICE |
| I4, I8, I3 | ALAN BIKING |
| I6, I9 | NATURE/OUTDOOR |

FIG. 8A
FIG. 8B
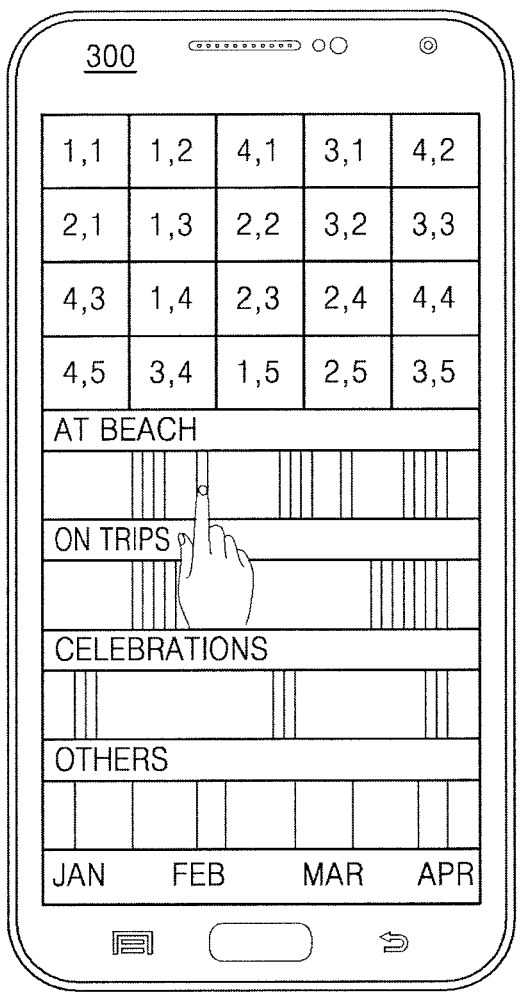
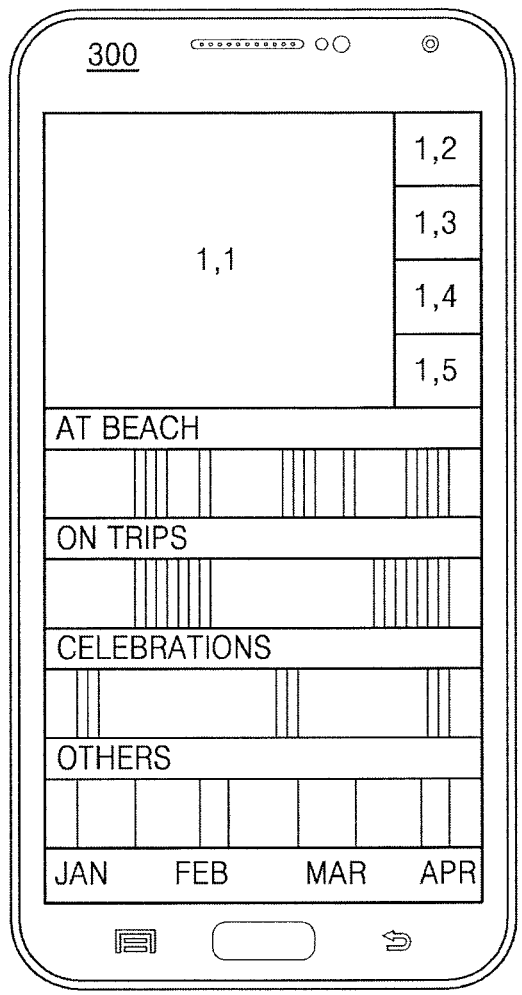
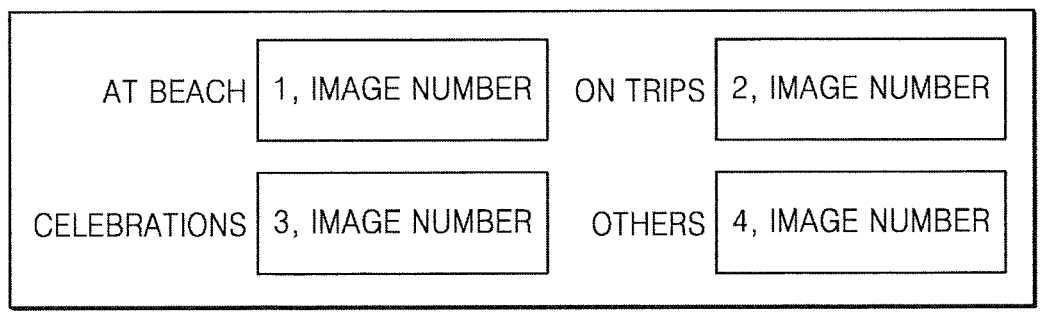

FIG. 10A
FIG. 10B
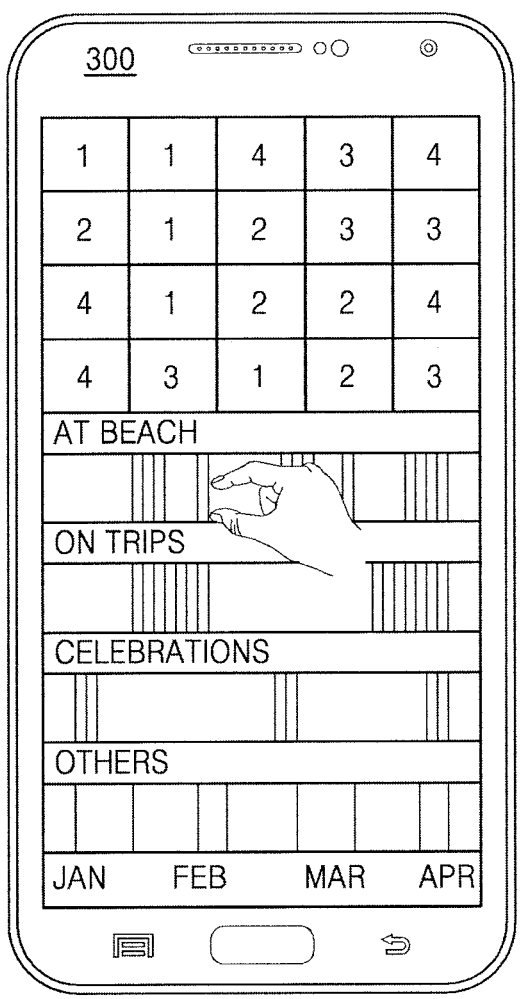
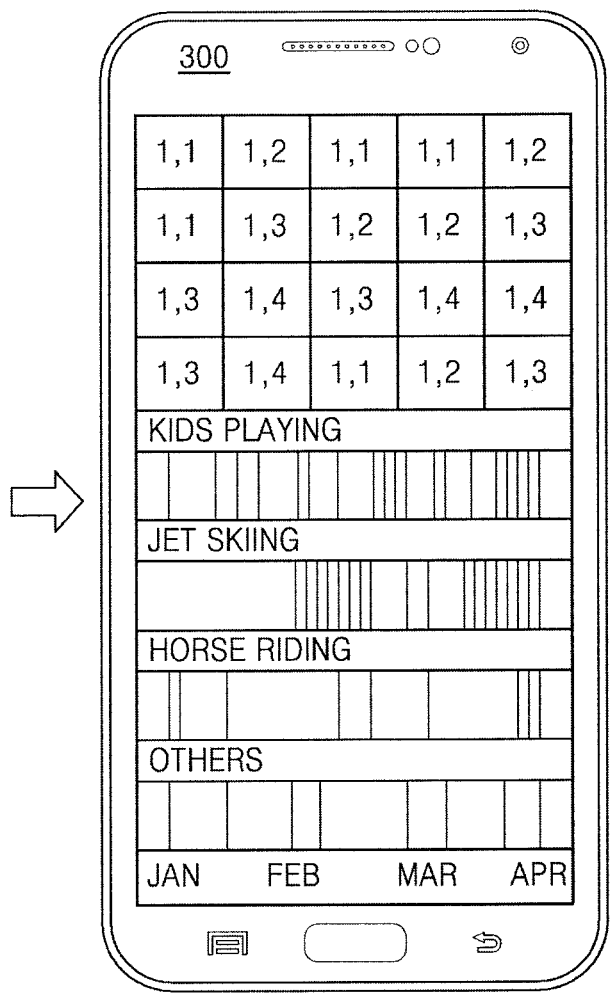
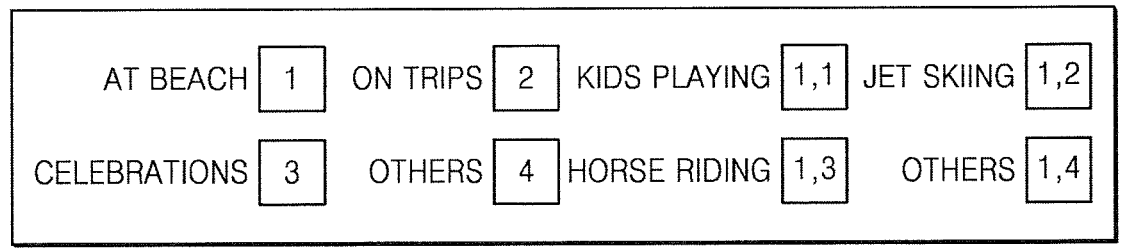

FIG. 12B
FIG. 12C
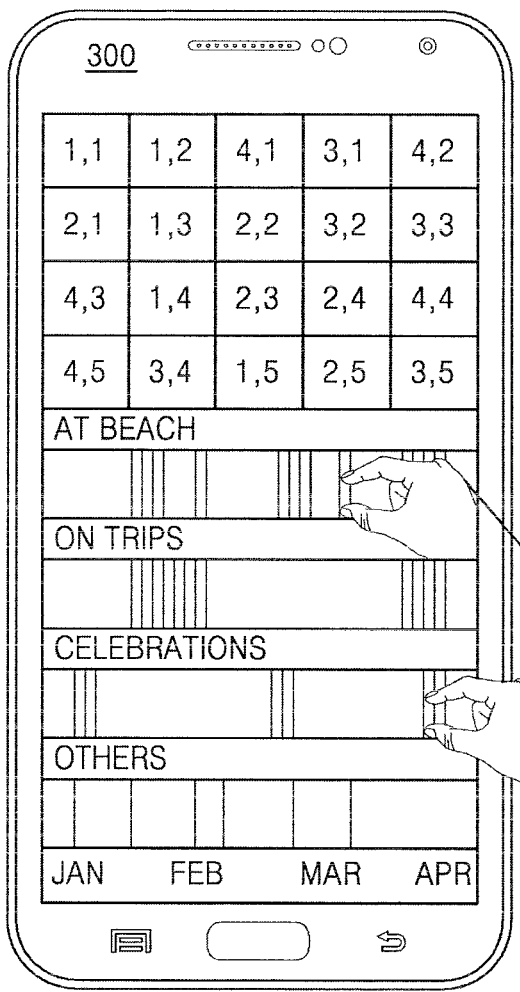
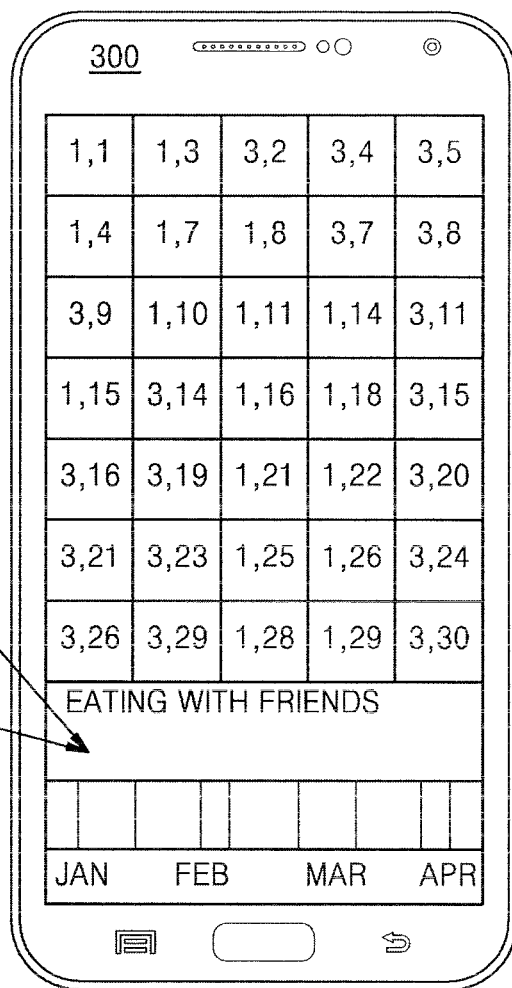
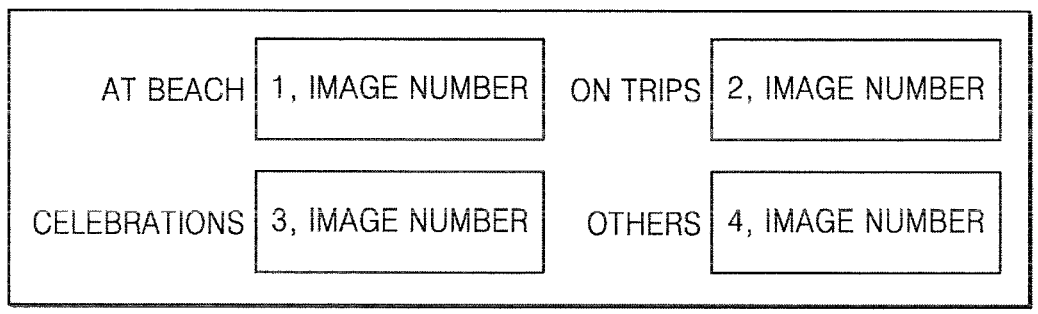

FIG. 13B
FIG. 13C
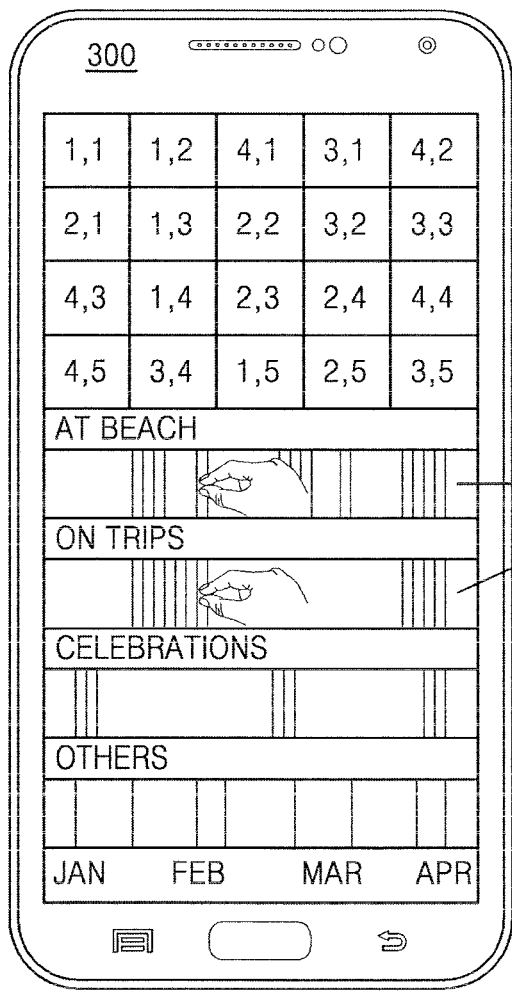
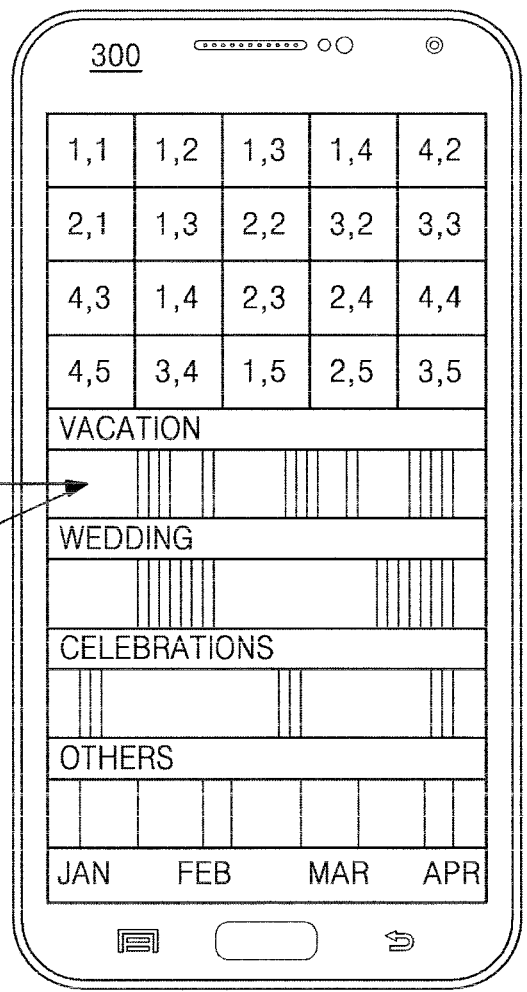
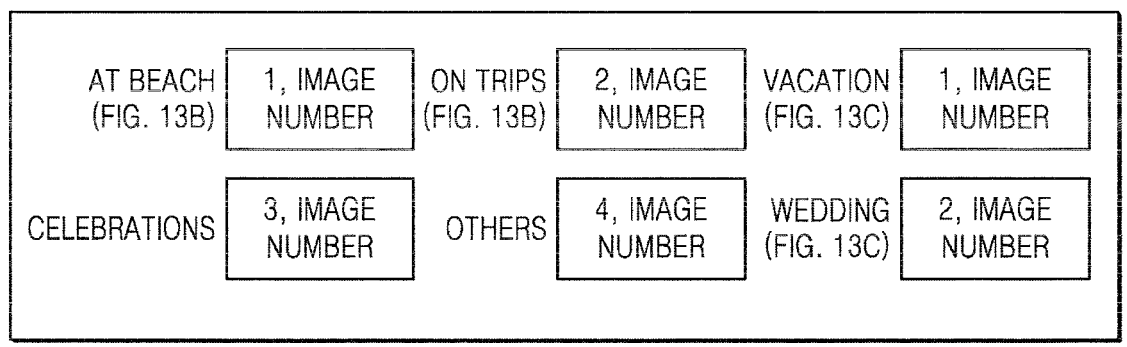

METHOD OF DISPLAYING IMAGES IN A MULTI-DIMENSIONAL MODE BASED ON PERSONALIZED TOPICS

CROSS-REFERENCE TO RELATED APPLICATION(S)

This application claims the benefit under 35 U.S.C. § 119(a) of an Indian patent application filed on Sep. 19, 2016 in the Indian Intellectual Property Office and assigned Serial number 201641031898, and of an Indian patent application filed on Apr. 5, 2017 in the Indian Intellectual Property Office and assigned Serial number 201641031898, the entire disclosure of each of which is hereby incorporated by reference.

TECHNICAL FIELD

The present disclosure relates to displaying images. More particularly, the present disclosure relates to a method of displaying images in a multi-dimensional mode based on personalized topics.

BACKGROUND

An electronic device, such as a smartphone, is capable of retrieving images from multiple electronic devices and through the internet. Images captured via a camera in the electronic device can also be stored in the electronic device. Over a period of time, the number of images stored in the electronic device, either retrieved from other sources or captured through the camera, may be relatively large. In existing electronic devices, when a relatively small number of images are stored in the electronic device, a user can easily retrieve intended images from the electronic device. However, if the user wishes to view a certain image along a timeline and a large number of images is stored in the electronic device, the user has to manually navigate the electronic device via an application which facilitates image viewing. This can be cumbersome and inconvenient to the user when a large number of images are stored in the electronic device.

Thus, a method is needed which can automatically classify images into categories, thereby enabling the user to easily access particular images stored in the electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of displaying images in a multi-dimensional mode based on personalized topics.

Another aspect of the present disclosure is to provide a method of categorizing an image, based on the image content, into a specific category, thereby enabling the user to easily access the image.

Another aspect of the present disclosure is to provide a method of generating a plurality of personalized topics from a plurality of images stored to an electronic device across a predetermined time period.

Another aspect of the present disclosure is to provide a method of displaying the plurality of personalized topics along the timeline.

Another aspect of the present disclosure is to provide a monitor whether images are stored to the electronic device.

Another aspect of the present disclosure is to provide a dynamically update the plurality of personalized topics in response to identifying images newly stored to the electronic device.

Another aspect of the present disclosure is to provide a form hierarchical level personalized topics for each of the plurality of personalized topics with inclusion of new images in the electronic device.

In accordance with an aspect of the present disclosure, a method and an electronic device for displaying images in a multi-dimensional mode based on personalized topics are provided. The method includes generating a plurality of personalized topics based on a plurality of images stored in the electronic device across a predetermined time period, and displaying the plurality of personalized topics along a timeline.

In an embodiment, the method includes displaying indicia along the timeline in combination with each of the plurality of personalized topics and varying the indicia according to a number of images included in the electronic device in the predetermined time period.

In an embodiment, generating the plurality of personalized topics includes generating each of the plurality of personalized topics based on tags associated with the images.

In an embodiment, the method includes monitoring, at an interval, whether at least one image is stored to the electronic device during a consecutive time period following the predetermined time period.

In an embodiment, the generating includes forming hierarchical level personalized topics for each of the plurality of personalized topics.

The method includes detecting a gesture on indicia corresponding to one of the plurality of personalized topics and thereafter displaying images categorized under one of the plurality of personalized topics based on the detected gesture.

In an embodiment, the method includes detecting a touch gesture on the indicia corresponding to the one of the plurality of personalized topics with respect to a time period included in the timeline. Further, the method includes displaying images categorized under the one of the plurality of personalized topics corresponding to the time period included in the timeline.

In an embodiment, the method includes detecting a swipe gesture on the indicia corresponding to one of the plurality of personalized topics and a time period included in the timeline, and displaying images categorized under the personalized topic and corresponding to the time period included in the timeline.

In an embodiment, the method includes detecting a pinch open gesture on the indicia corresponding to one of the plurality of personalized topics and a time period included in the timeline, and displaying, with respect to the personalized topic, images which correspond to the time period included in the timeline and are categorized under a hierarchical level personalized topic corresponding to the personalized topic.

In an embodiment, the method includes detecting a pinch open gesture input with respect to a time period included in the timeline, generating a plurality of additional personalized topics from a plurality of images included in the electronic device and corresponding to the time period included in the timeline, and displaying the plurality of additional personalized topics across the timeline.

In an embodiment, the method includes detecting a gesture input with respect to at least two personalized topics included among the plurality of personalized topics and a time period included in the timeline, detecting a pinch open gesture input with respect to the at least two personalized topics and the time period included in the timeline, categorizing images associated with the at least two personalized topics under a hierarchical level personalized topic belonging to at least two personalized topics, and displaying images categorized under the hierarchical level personalized topic.

In an embodiment, the method includes detecting a gesture input with respect to at least two personalized topics included among the plurality of personalized topics and a time period included in the timeline, detecting a pinch gesture input with respect to the at least two personalized topics and the time period included in the timeline, forming a new personalized topic which includes the images categorized under the two personalized topics, and displaying images categorized under the formed personalized topic. The forming of the new personalized topic includes identifying hierarchical level personalized topics of the at least two personalized topics.

In accordance with another aspect of the present disclosure, an electronic device for displaying images in a multi-dimensional mode based on personalized topics is provided. The electronic device includes at least one processor configured to generate a plurality of personalized topics based on a plurality of images stored in the electronic device across a predetermined time period, and display the plurality of personalized topics along a timeline.

Other aspects, advantages, and salient features of the disclosure will become apparent to those skilled in the art from the following detailed description, which taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 8A and 8B illustrate displaying images across a time period based on a touch gesture, in which the displayed images are categorized under a personalized topic according to various embodiments of the present disclosure;

FIGS. 10A and 10B illustrate displaying images categorized with personalized topics which are hierarchical levels of a personalized topic, across the timeline based on a pinch open gesture, according to various embodiments of the present disclosure;

FIGS. 12A, 12B, and 12C illustrate displaying images categorized with at least two personalized topics, across a timeline based on a pinch open gesture, according to various embodiments of the present disclosure;

FIGS. 13A, 13B, and 13C illustrate displaying images categorized under a new personalized topic, in which the new personalized topic includes images categorized under two personalized topics according to various embodiments of the present disclosure.

Throughout the drawings, like reference numerals will be understood to refer to like parts, components, and structures.

DETAILED DESCRIPTION

Figure 1A:
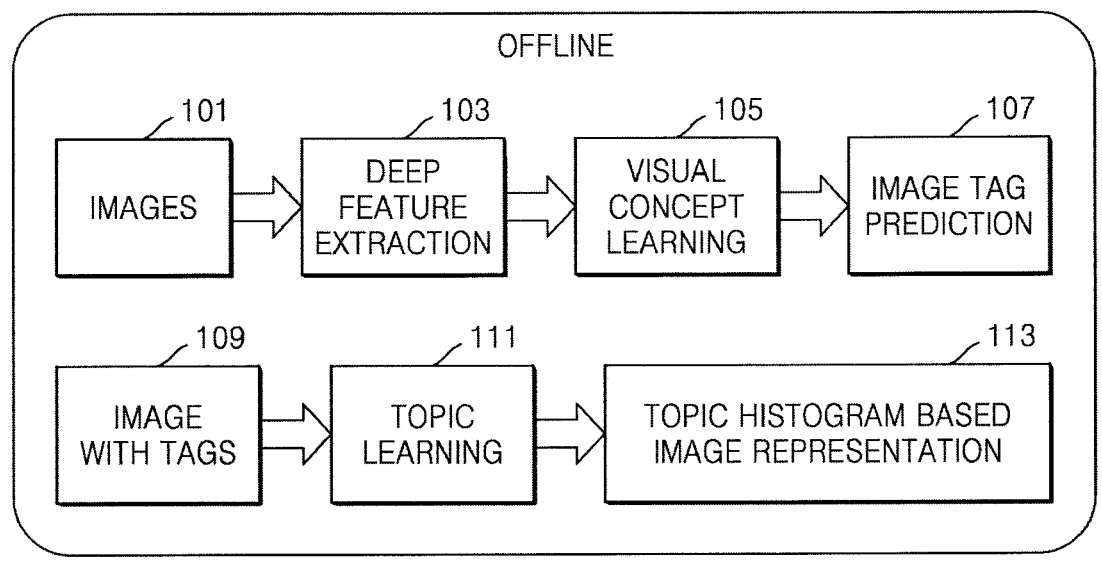
FIGS. 1A and 1B are representative block diagrams illustrating a method of displaying images in a multi-dimensional mode based on personalized topics according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Accordingly, embodiments herein provide a method and an electronic device for displaying images in a multi-dimensional mode based on personalized topics. The method includes generating a plurality of personalized topics based on a plurality of images stored in the electronic device across a selected and/or predetermined time period. Further, the method includes displaying the plurality of personalized topics along a timeline.

It is to be noted that the timeline can be segmented into numerous time periods. The number of such time periods may be based on segment size. The term timeline can also be interpreted as a time period, and as such is also referred to a time period in the description in certain examples. In such instances, it is to be considered that the term timeline therein refers to the total time period over which the images are displayed.

Unlike methods of the related art, the disclosed method provides for multi-dimensional visualization of images stored in the electronic device, based on personalized topics. The disclosed method includes displaying a plurality of personalized topics along a timeline. The disclosed method provides a multi-dimensional user interface (UI), which enables the user to navigate through the stored images based on the personalized topics. The disclosed method provides for automatic identification of the personalized topics and the corresponding hierarchical levels for categorizing the images.

Referring now to the drawings and more particularly to FIGS. 1A through 14, where similar reference characters denote corresponding features consistently throughout the figures, there are shown various embodiments.

Figure 1B:
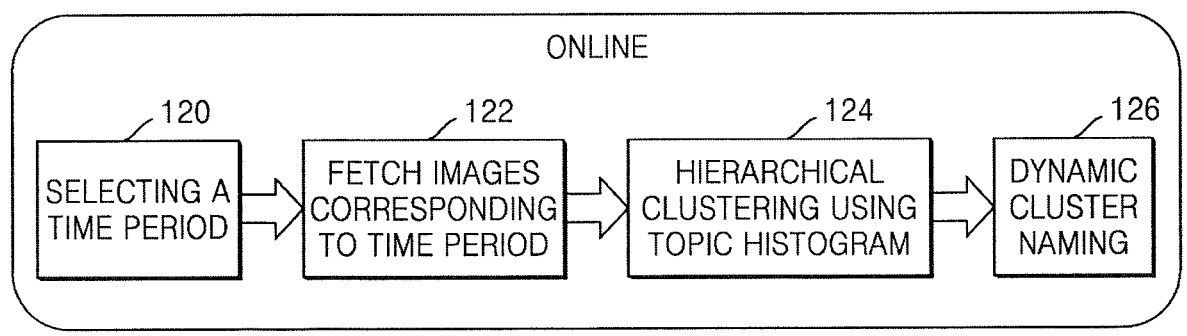

FIGS. 1A and 1B are representative block diagrams illustrating the disclosed method of displaying images in a multi-dimensional mode based on personalized topics according to various embodiments of the present disclosure.

The disclosed method may be implemented in an electronic device. In an embodiment, the electronic device is a smartphone equipped with image processing capabilities. It is to be understood that the electronic device, in which the disclosed method is implemented, is also capable of receiving images through means other than those described herein.

Referring to FIGS. 1A and 1B the block diagram illustrates functionalities performed during online and offline modes, respectively. Offline mode refers to a mode in which functionalities are performed using images stored in the electronic device, while the electronic device is in standby mode. Online mode refers to a mode in which functionalities are performed when a new image included in the electronic device (e.g., an image newly captured by or stored to the electronic device). The functionalities of the online mode also include displaying the personalized topics along a timeline.

Considering the functionalities of the offline mode, as depicted in FIG. 1A, initially, the electronic device may perform deep feature extraction in operation 103 on the images 101 stored in the electronic device. Deep feature extraction may be performed, for instance, by applying deep feature learning techniques. Deep feature learning techniques use large amounts of labeled training data to train a neural network model for accomplishing a particular task. The training model, typically, has millions of parameters which perform nonlinear transformation on the input data (e.g. images). These parameters are learned during the training for a specific task (like image classification—object identification, scene understanding, face recognition etc.). Once the models are learned, they can be used to perform those specific tasks. In the present disclosure, multiple models for different tasks would be trained and used. For example, a face recognition model may be used to obtain features from images which would be potent enough to differentiate between faces. A reference face may be picked up from a face photo used in a contacts list included in a user's phone. The features from different images in the gallery can be used to differentiate and register different faces (e.g., 'Alan'). Similarly a different model can be used for scene/activity understanding. Using these models, images such as beach, restaurant, etc. can be classified, if the image contains the visual features of a beach, restaurant, etc. Combining such information, like 'Alan' and 'beach' from a single image, the photo can be classified with "Alan at the beach." According to the disclosed method, the electronic device may analyze the contents of the images via a visual concept learning operation in operation 105. During deep feature extraction, the images stored in the electronic device are fed to a deep feature learning device (e.g., a feature extractor) to extract non-linear features from the images. The electronic device may thereafter generate, based on the non-linear features, visual concepts such as objects, people, places, background, activity, and abstract concepts such as happy, or the like, for each image. Based on the visual concept learning, the electronic device may at operation 107 predict tags and associate the tags with the images stored in the electronic device. Further, during deep feature extraction, the electronic device may identify any global positioning system (GPS) information or custom description information stored within the images. For example, the electronic device may determine whether any of the images include GPS information indicative of coordinates where an image capture device (e.g., the electronic device, an image capture device different from the electronic device, etc.) captured the images. In another example, the electronic device may determine whether any of the images include custom description information (e.g., a user entered memo such as "pasta lunch with Alan at ABC restaurant"). When the electronic device determines that an image includes such GPS information or custom description information, the electronic device may extract and utilize the information in associating tags with the image.

Once tags are associated with the images in operation 109, the electronic device may proceed to a topic learning operation in operation 111. During the topic learning operation, concepts used by the electronic device for tagging the images may be stored as metadata and fed to a topic modeling/learning engine to learn prominent topics (e.g., topics prominent based on image content). Topic learning refers to learning based on which personalized topics are generated. Topic learning includes analyzing associated tags and histograms of each image, and thereafter, generating a personalized topic for each image. The electronic device may categorize or cluster images according to the learned topics (topic histogram-based clustering), i.e., personalized topics. The electronic device may display the images stored in the electronic device based on topic histogram, i.e., personalized topics, in operation 113.

In an embodiment, the electronic device may rename the personalized topics (cluster), for example, via dynamic cluster-based naming. The renaming operation can be performed by the electronic device either automatically by the disclosed method or in response to a user input. Images can be associated with overlapping categories, i.e., images can be categorized under multiple personalized topics. The electronic device may feed an image, along with information relevant to the image, such as the date of capture, date modified, or the like, and visual concepts, to a visualization framework to be represented in two dimensional (2D) UI. Via the 2D UI displayed by the electronic device, the user may visualize the functionality of the disclosed method, which is the displaying the personalized topics along a timeline. The timeline is a time period whose range is selectable or predetermined by the user. The details of the selection or the predetermination of the time period will be better understood in reference to the description of the online mode.

It is to be understood that the disclosed method can be extended to display images in a multi-dimensional mode.

When an image is newly captured by or stored to the electronic device (e.g., using a camera, downloaded from the internet, or the like), the electronic device may generate features and prominent topics of the image and carry out a complete flow, i.e., from topic modeling/learning to UI generation, based on the new image and currently stored images.

Referring to FIG. 1B, the functionalities of the online mode are performed when a new image is included in the electronic device or when the user desires to visualize the display of the plurality of personalized topics along a timeline. When the user desires to visualize the display of the plurality of personalized topics along a timeline, the user in operation 120 selects the range of the timeline, i.e., the time period across which the images categorized under the personalized topics are displayed.

In response to a user input selecting or setting a time period, then in operation 122, the electronic device may collect images that have been stored in the electronic device in that time period. The electronic device may carry out the complete flow of the disclosed method using the images that have been stored in that time period as well as new images. As a result of the complete flow, outcomes which may be achieved include forming a pre-defined number of hierarchical levels of a personalized topic in operation 124, dynamically updating a cluster name (personalized topic) in operation 126, or the like. Thereafter, the images categorized under respective personalized topics are displayed along the time period.

Figures 2A, 2B, 2C:
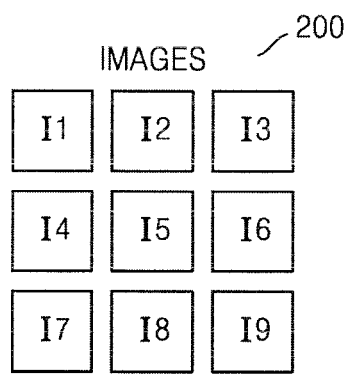
FIGS. 2A, 2B, and 2C depict example scenarios in which a plurality of personalized topics are generated from a plurality of images according to various embodiments of the present disclosure.

FIGS. 2A, 2B, and 2C depict example scenarios in which a plurality of personalized topics is generated from a plurality of images according to various embodiments of the present disclosure.

Referring to FIG. 2A, a plurality of images 200 is stored in the electronic device. In an embodiment, the electronic device is a smartphone. The images in the electronic device may be stored by various means such as capture by a camera of the electronic device, receiving from external devices through wired or wireless medium, through a universal serial bus (USB), downloading from cloud storage, online drives, e-mail, or the like. As depicted in FIG. 2A, in an example, 9 images I1, I2, . . . I9 are stored in the electronic device.

In an embodiment, the disclosed method includes performing deep feature extraction of the content in each of the plurality of images and thereafter associating at least one tag with each of the plurality of images. As depicted in FIG. 2B, for the image I1, the disclosed method includes performing feature extraction and thereafter associating tags with image I1. In an example, the disclosed method associates tags Alan, Alice, Susan, Play, and Park with image I1 based on the feature extraction of image I1. Similarly, the disclosed method includes performing feature extraction of the images I2 . . . I9 and thereafter associating at least one tag to the images I2 . . . I9. In associating the tags, the disclosed method is not limited to the description provided with respect to FIG. 2B. For example, for an image inclusive of GPS information (e.g., an image captured in Washington, D.C.), the disclosed method may include associating one or more tags corresponding to the GPS information (e.g., 'Washington, D.C.', 'USA') to the image. In another example, for an image inclusive of custom description information (e.g., a user entered memo such as "pasta lunch with Alan at ABC restaurant") the disclosed method may include associating one or more tags corresponding to the custom description information (e.g., 'restaurant', 'lunch', 'pasta', 'ABC restaurant').

The disclosed method includes generating a plurality of personalized topics from the plurality of images stored in the electronic device across a time period. The disclosed method further includes, after associating at least one tag to each of the plurality of images, generating a personalized topic for each of the plurality of images stored in the electronic device. Each personalized topic includes at least one image. According to the disclosed method, an image can be categorized under multiple personalized topics.

The disclosed method includes performing topic modeling using the associated tags and, thereafter, representing each of the plurality of images stored in the electronic device as a topic histogram, i.e., personalized topic. In an embodiment, a generated personalized topic can be referred to as a cluster of images. As depicted in FIG. 2C, based on the associated tags of the images I1, I7, namely, Alan, Alice, a personalized topic (topic histogram), Alan playing with Alice, is generated.

Figure 3:
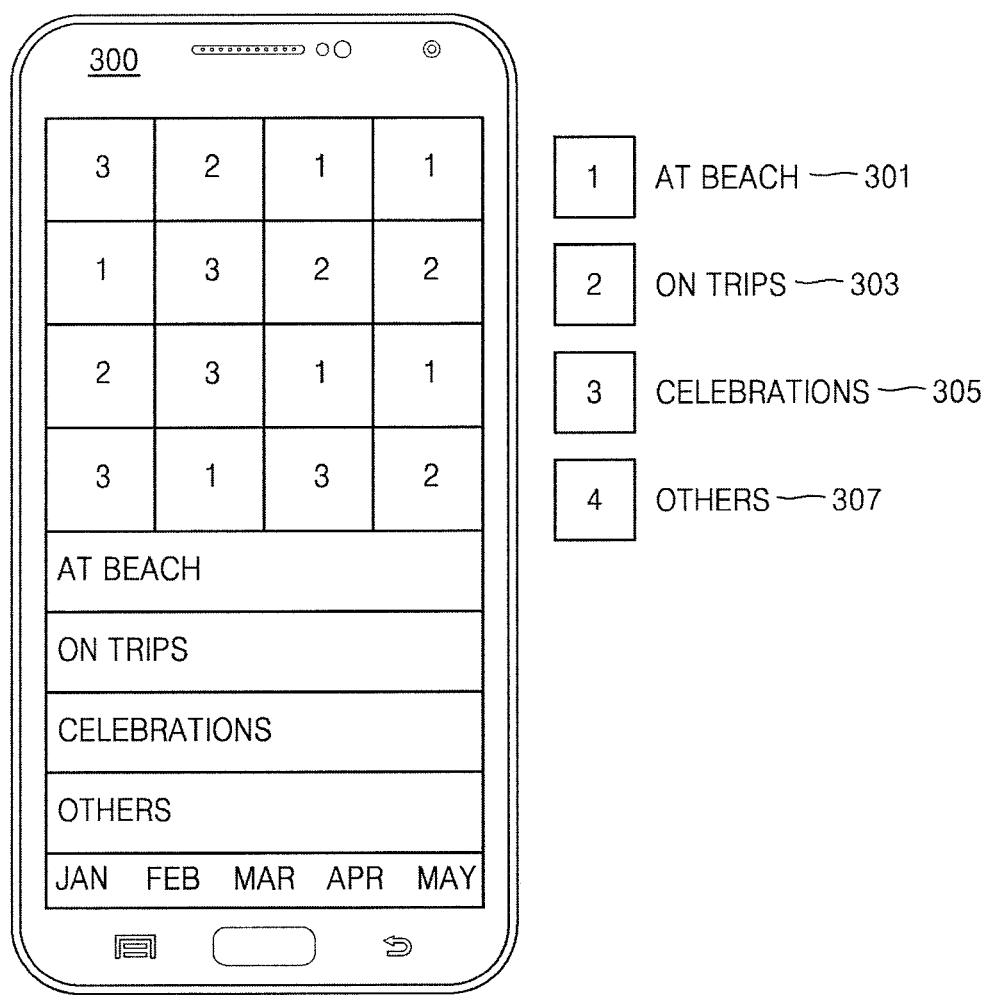
FIG. 3 illustrates a two-dimensional (2-D) user interface (UI) for navigating through images in an electronic device based on a plurality of personalized topics displayed along a timeline according to an embodiment of the present disclosure.

FIG. 3 illustrates a 2D UI for navigating through images in an electronic device 300 along a timeline based on a plurality of personalized topics according to an embodiment of the present disclosure.

Referring to FIG. 3, the disclosed method includes displaying the plurality of personalized topics along a timeline on the screen of the electronic device 300. The disclosed method includes generating four personalized topics, namely, 'at beach' 301, 'on trips' 303, 'celebrations' 305, and 'others' 307. The personalized topics are generated based on topic learning. The images categorized under the personalized tag 'at beach' 301 are each indicated by a '1'. The images categorized under the personalized tag 'on trips' 303 are each indicated by a '2'. The images categorized under the personalized tag 'celebrations' 305 are each indicated by a '3'. The images categorized under the personalized tag 'others' 307 are each indicated by a '4'. The four personalized topics are displayed across the timeline, which in this example spans from January to May. The electronic device 300 may select, set, or modify the timeline in response to inputs from the user.

In response to a user input selecting the timeline (i.e., the time period over which the images were stored in the electronic device 300), the electronic device 300 may display the images stored in the electronic device 300 across the timeline and new images included in the electronic device 300 from left to right.

The personalized topic 'at beach' 301, for example, is a cluster consisting of at least one image, and each image included in the cluster may be associated with at least one tag. Based on the associated tags, the electronic device 300 may categorize the images as being relevant to 'at beach' through feature extraction of the images. The electronic device 100 may associate tags with the images based on feature extraction. According to the disclosed method, the electronic device 300 may categorize all images stored in the electronic device 300 among the learned personalized topics.

The disclosed method includes either categorizing new images included in the electronic device 300 into one of the existing personalized topics or generating a new personalized topic, based on the associated tags of the new images. According to the disclosed method, the user may rename the generated personalized topics via the electronic device 300. The electronic device 300 may update personalized topics automatically when new images are included. In an example, when a personalized topic is updated, the electronic device 300 may form a hierarchy with the inclusion of new images. In another example, the electronic device 300 may generate new hierarchical level personalized topics when new images are included and update the personalized topic accordingly.

Figure 4:
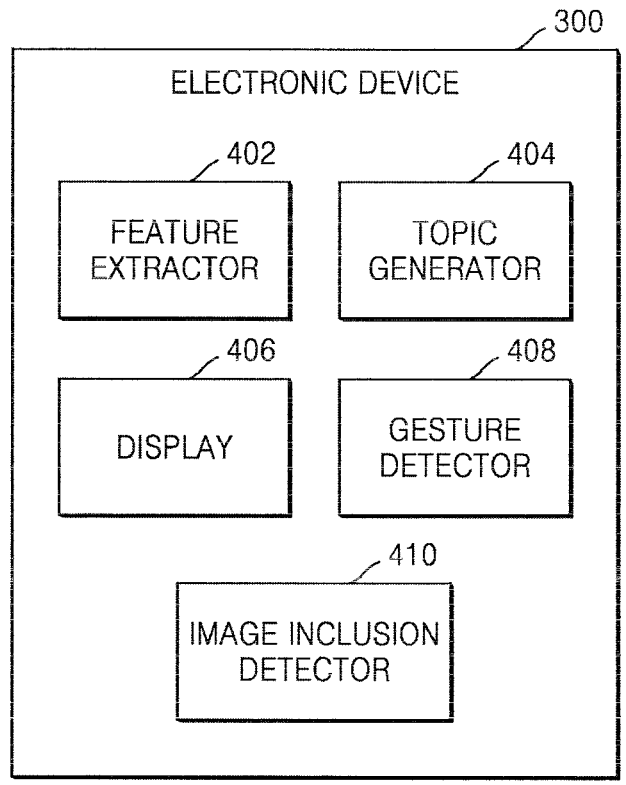
FIG. 4 illustrates various units of the electronic device for implementing the disclosed method according to an embodiment of the present disclosure.

FIG. 4 illustrates various units of the electronic device 300 for implementing the disclosed method according to an embodiment of the present disclosure.

Referring to FIG. 4, the various units of the electronic device 300 are feature extractor 402, topic generator 404, display 406, gesture detector 408, and image inclusion detector 410. The feature extractor 402, topic generator 404, gesture detector 408, and image inclusion detector 410 can be implemented as at least one hardware processor.

The feature extractor 402 performs feature extraction of the images stored in the electronic device 300 and new images included in the electronic device 300. The contents of the images are analyzed for visual concept learning. The feature extractor 402 extracts non-linear features from the images, which the electronic device 300 may use for generating visual concepts such as objects, person, places, background, activity, abstract concepts like happy, or the like, for each image. Based on the visual concept learning, the electronic device 300 may predict a tag. The feature extractor 402 may associate the predicted tags with the images stored in the electronic device 300.

The topic generator 404 performs topic learning on the images which are associated with tags by the feature extractor 402. The topic generator 404 may generate a plurality of personalized topics from a plurality of images included in the electronic device 300 across a time period. The topic generator 404 may store metadata based on concepts used for tagging the images stored in the electronic device 300. The topic generator 404 may perform topic modeling/learning based on the concepts used for tagging the images in order to thereby learn the prominent topics. The electronic device 300 may generate the personalized topics through topic learning. The topic generator 404 may categorize the images or create clusters of images according to the learned topics, i.e., personalized topics. The topic generator 404 may represent the images stored in the electronic device 300 based on the topic histogram.

In response to a user input, the topic generator 404 of the electronic device 300 may rename the personalized topics. The topic generator 404 provides for categorization of a particular image according to multiple personalized topics.

The display 406 may display the plurality of personalized topics along a timeline. In an embodiment, the electronic device 300 may feed the images along with relevant information, such as the date of capture, date modified, or the like, and visual concepts to the display unit 406 (visualization framework) to be represented in a 2D UI. Via the 2D UI displayed by the electronic device, the user may visualize the functionality of the disclosed method, which is the displaying of the plurality of personalized topics along the timeline. The timeline is a time period whose range is selectable by the user.

The user may enter a user input selecting a time period across which the plurality of personalized topics is to be displayed. In response to the user input, the display 406 may collect the images that have been stored in the electronic device 300 in that time period and the new images included in the electronic device 300. Thereafter, the display 406 may display the images, categorized under the respective personalized topics, along the time period. The range of the time period is selectable by the user.

The display 406 may display each of the plurality of personalized topics across the timeline with indicia. In an embodiment, the display unit 406 may vary the indicia based on the number of images included in the electronic device 300 in a time period in the timeline.

The gesture detector 408 may detect gesture inputs with respect to the plurality of personalized topics. The display 406 may display images categorized under personalized topics corresponding to detected gesture inputs. The gesture detector 408 may detect different gestures such as touch, hover, swipe, pinch, pinch open, or the like. Based on the gesture, the electronic device 300 may display images categorized under one or a plurality of personalized topics.

In an embodiment, the gesture detector 408 may detect a touch gesture input with respect to one of the plurality of personalized topics at a time period in the timeline. Thereafter, the electronic device 300 may display the images categorized under the personalized topic corresponding to the detected touch gesture (e.g., selected by the touch gesture).

The image inclusion detector 410 monitors for inclusion of new images in the electronic device 300. The image inclusion detector 410 may dynamically update the plurality of personalized topics in accordance with detecting the inclusion of new images in the electronic device 300. The electronic device 300 may form hierarchical levels for each of the plurality of personalized topics with the inclusion of new images in the electronic device 300. When a new image is included in the electronic device, the electronic device 300 may form one or more hierarchical levels of a personalized topic. If the new images are categorized under a personalized topic, the electronic device 300 may update said personalized topic.

FIG. 4 provides an overview of the electronic device 300, and it is to be understood that other embodiments are not limited thereto. The labels or names of the units are used only for illustrative purposes and do not limit the scope of the disclosure. Further, the electronic device 300 can include any number of units or sub-units capable of communicating with one another along with the other components. Likewise, the functionalities of one or more units can be combined as a single unit or can be arranged or coupled together in a manner different than described herein without departing from the scope of the disclosure.

Figure 5:
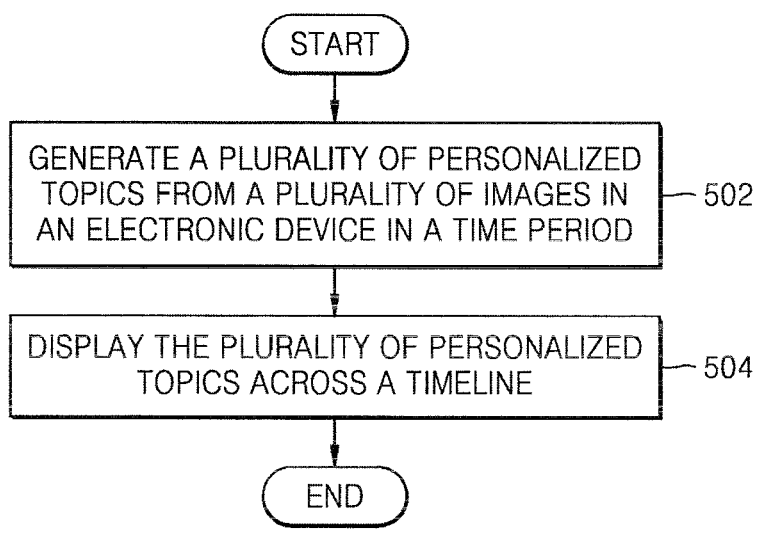
FIG. 5 is a flowchart depicting a method of displaying images in a multi-dimensional mode based on the personalized topics according to an embodiment of the present disclosure.

FIG. 5 is a flowchart 500 depicting a method of displaying images in a multi-dimensional mode based on personalized topics according to an embodiment of the present disclosure.

Referring to FIG. 5, at operation 502, the method includes generating a plurality of personalized topics from a plurality of images included in the electronic device 300 across a time period (e.g., images added to, stored to, transferred to, or captured by the electronic device 300 during a time period). The disclosed method includes performing deep feature extraction of the content in each of the plurality of images through the feature extractor 402. Thereafter, the disclosed method includes associating the at least one tag with each of the plurality of images.

The disclosed method includes generating, through the topic generator 404, a plurality of personalized topics from the plurality of images stored or included in the electronic device 300 (e.g., images previously, currently, or newly stored to, transferred to, or captured by the electronic device 300) across a time period. The method further includes, once each of the plurality of images is associated with at least one tag, generating a personalized topic for each of the plurality of images. Each personalized topic consists of at least one image. Each image can be associated with multiple personalized topics.

The disclosed method further includes performing topic modeling, through the topic generator 404, using the associated tags. The electronic device 300 may represent each of the plurality of images stored in the electronic device 300 as a topic histogram.

New images included in the electronic device 300 (e.g., images newly stored to, transferred to, or captured by the electronic device 300) can be categorized under one of the existing personalized topics or categorized under a newly generated personalized topic. The electronic device 300 may categorize the new images based on the tags associated with the new images. The electronic device 300 may update the personalized topics when new images are included. In an example, the electronic device 300 may update a personalized topic when forming a hierarchy with the inclusion of new images.

At operation 504, the method includes displaying the plurality of personalized topics along a timeline. The timeline refers to the time period over which the plurality of images was stored in the electronic device 300. The range of the timeline is selectable by the user. For example, the timeline may be the range January-April. In response to a user input selecting a timeline, the electronic device 300 may display the images categorized under the personalized topics and which were stored in the electronic device 300 along the time period, along with new images included in the electronic device 300 (e.g., images newly stored to, transferred to, or captured by the electronic device 300), on the screen of the electronic device 300. The electronic device 300 may define 'new images' as images stored to, transferred to, or captured by the electronic device 300 within, for example, the past 24 hours, the past 3 days, or any configurable duration. In another example, the electronic device 300 may define 'new images' as images stored to, transferred to, or captured by the electronic device 300 since the last time images stored on the electronic device 300 were accessed by the user or backed up to another storage device (e.g., cloud-based storage, external secure digital (SD) card, external hard drive, etc.).

According to the disclosed method, the user may visualize the display of the plurality of personalized topics across the timeline in a 2D UI via the electronic device 300. According to the disclosed method, the display unit 406 may display the images in a 2D UI inclusive of information pertaining to the images such as the date of capture, date modified, GPS information indicating capture location, or the like.

The various actions, acts, blocks, operations, or the like in the method may be performed in the order presented, in a different order or simultaneously. Further, in some embodiments, some of the actions, acts, blocks, operations, or the like may be omitted, added, modified, skipped, or the like without departing from the scope of the disclosure. The method and related descriptions provide a basis for a control program, which can be easily implemented by a microcontroller, a microprocessor, or a combination thereof.

Figure 6:
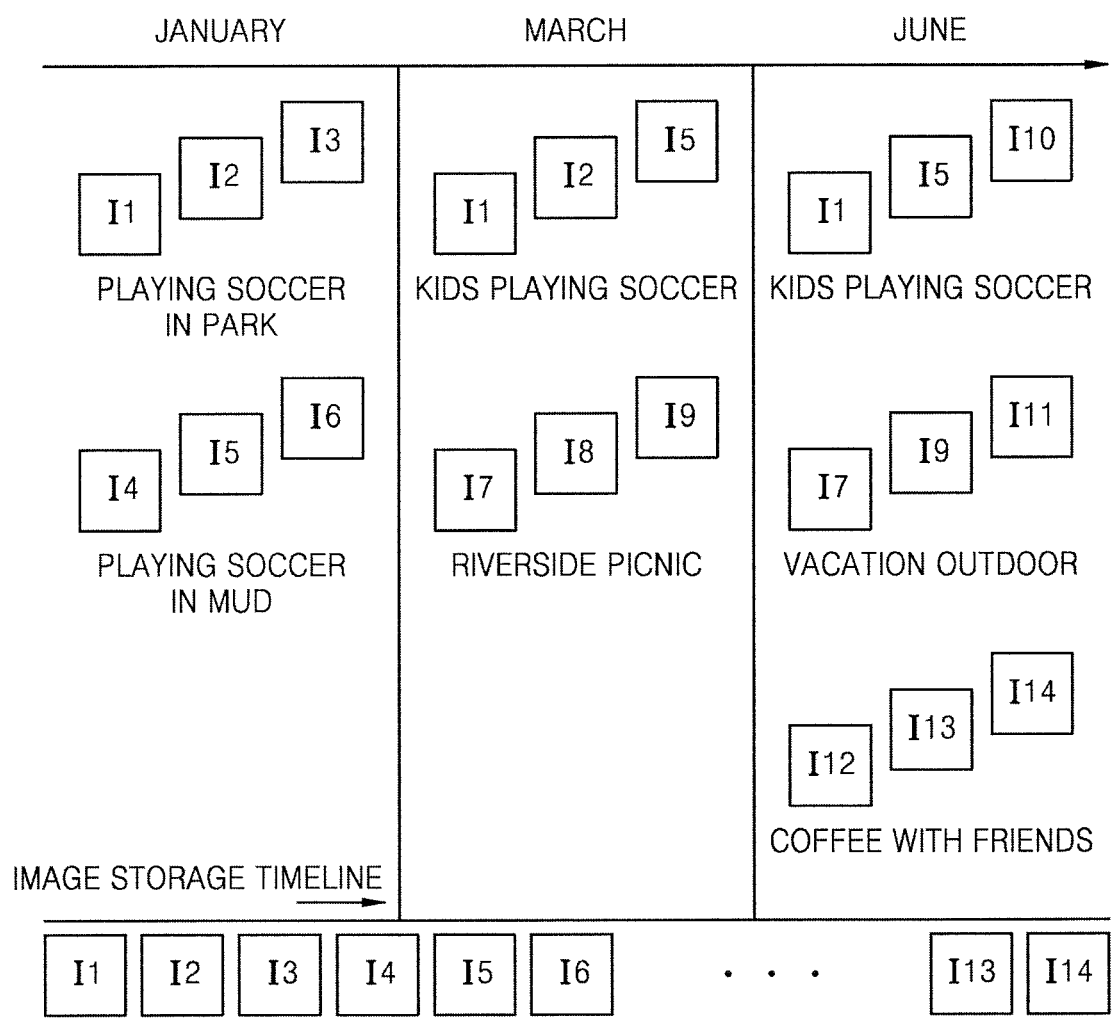
FIG. 6 illustrates updating of a personalized topic across the timeline by inclusion of new images in the electronic device according to an embodiment of the present disclosure.

FIG. 6 illustrates updating of a personalized topic across the timeline based on inclusion of new images in the electronic device 300 according to an embodiment of the present disclosure.

The electronic device 300 may adaptively update personalized topics (e.g., adaptive categorization). The electronic device 300 may update a personalized topic with new images across a timeline. The inclusion of the new images is detected (e.g., detection of images newly stored to, transferred to, or captured by the electronic device 300) by the image inclusion detection unit 410. The image inclusion detector 410 may monitor for the inclusion of new images in the electronic device 300 at intervals. The intervals may be configured by, for example, the electronic device 300 or the user.

Referring to FIG. 6, in January, two personalized topics namely, 'playing soccer in park' and 'playing soccer in mud' are displayed. The images categorized under the personalized topic 'playing soccer in park', are I1, I2, and I3. The images categorized under the personalized topic 'playing soccer in mud', are I4, I5, and I6. The categorization is performed by the topic generator 404.

With the inclusion of new images, i.e., I7, I8, and I9, in March, the electronic device 300 updates the personalized topic 'playing soccer in park' to 'kids playing soccer'. In the update, the electronic device 300 merges images categorized under the personalized topic 'playing soccer in mud' with the images categorized under the personalized topic 'playing soccer in park'. The merger of images is not limited to the example provided herein. For example, in the update, the electronic device 300 can also update the personalized topic 'playing soccer in mud' to 'kids playing soccer'. In another example, in the update, the electronic device 300 merges the images categorized under the personalized topic 'playing soccer in park' with the images categorized under the personalized topic 'playing soccer in mud'.

Although in FIG. 6 only images I1, I2, and I5 are depicted as categorized under the personalized topic 'kids playing soccer', it is to be understood that the personalized topic 'kids playing soccer' includes all the images of the personalized topics 'playing soccer in park' and 'playing soccer in mud' (i.e., I1 through I6).

With the inclusion of the images I7, I8, and I9 in March, the electronic device 300 forms a new personalized topic 'riverside picnic'.

In June, new images namely, I10, I11, I12, I13, and I14 are included (e.g., images are newly stored to, transferred to, or captured by the electronic device 300). The electronic device 300 categorizes image I10 under the personalized topic 'kids playing soccer'. Further, the electronic device 300 renames the personalized topic 'riverside picnic' to 'vacation outdoor' and includes image I11 thereunder. The renaming may be performed either in response to a user input or automatically (disclosed method). The electronic device 300 may rename personalized topics based on a determination of whether the feature extractor 402 associates a tag with newly included images. For example, during feature extraction, the feature extractor 402 did not associate a tag relevant to the personalized topic 'riverside picnic' with the image I11. The electronic device 300 thus merges images categorized under the personalized topic 'riverside picnic' with the image I11 and renames the personalized topic 'riverside picnic' to 'vacation outdoor'. Further, the electronic device 300 creates a new personalized topic 'coffee with friends' and categorizes images I12, I13, and I14 under the personalized topic 'coffee with friends'.

Figure 7:
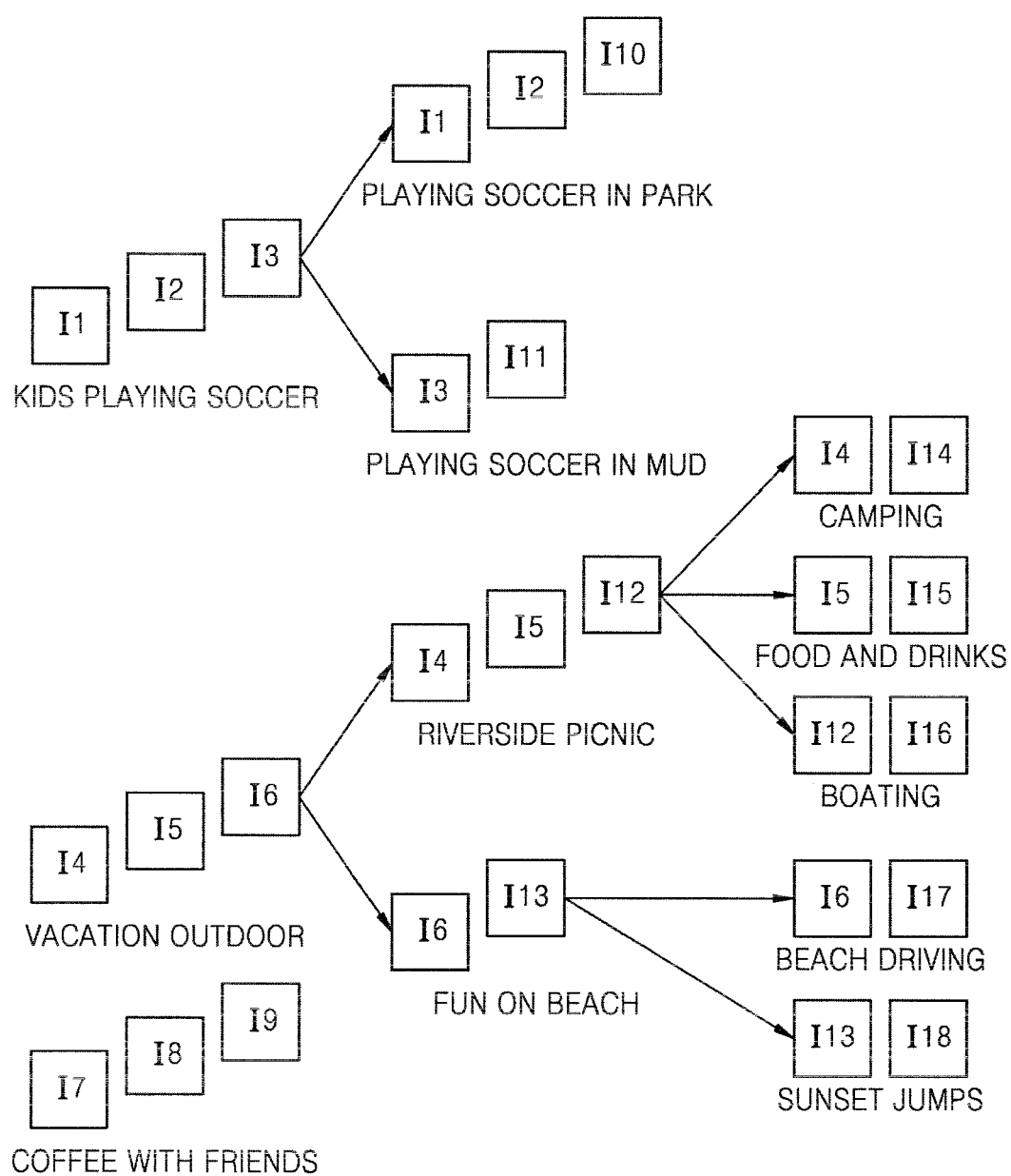
FIG. 7 illustrates formation of hierarchical levels in a time period with inclusion of new images in the electronic device according to an embodiment of the present disclosure.

FIG. 7 illustrates formation of hierarchical levels in a time period with inclusion of new images in the electronic device 300 according to an embodiment of the present disclosure.

The electronic device 300 may detect, via the image inclusion detector 410, inclusion of the new images in a time period in the timeline and form hierarchical levels for each of the plurality of personalized topics. As depicted in FIG. 7, the time period is June. However, the example various embodiments are not limited thereto. The time period can be set to any range desired by the user, for example, January-December.

Referring to FIG. 7, initially there are three personalized topics namely, 'kids playing soccer', 'vacation outdoor', and 'coffee with friends'. The images categorized under the personalized topic 'kids playing soccer', are I1, I2, and I3. The images categorized under the personalized topic 'riverside picnic', are I4, I5, and I6. The images categorized under the personalized topic 'coffee with friends', are I7, I8, and I9.

With the inclusion of new images namely, I10 and I11, the electronic device 300 forms two new personalized topics namely, 'playing soccer in park' and 'playing soccer in mud', at the first hierarchical level of the personalized topic 'kids playing soccer'. The electronic device 300 categorizes the existing images I1 and I2 and the new image I10 under the new personalized topic 'playing soccer in park'. Further, the electronic device 300 categorizes the existing image I3 and the new image I11 under the new personalized topic 'playing soccer in mud'.

With the inclusion of new images namely, I12 and I13, the electronic device 300 forms two new personalized topics 'riverside picnic' and 'fun on beach' at the first hierarchical level of the personalized topic 'vacation outdoor'. The electronic device 300 categorizes the existing images I4 and I5 and the new image I12 under the new personalized topic 'riverside picnic'. Further, the electronic device 300 categorizes the existing image I6 and the new image I13 under the new personalized topic 'fun on beach'.

With the inclusion of new images namely, I14, I15, and I16, the electronic device 300 forms three new personalized topics namely, 'camping', 'food and drinks' and 'boating' at a second hierarchical level of the personalized topic 'vacation outdoor' (i.e., at a sub-hierarchical level of the personalized topic 'riverside picnic'). The electronic device 300 categorizes existing images I4 and the new image I14 under the new personalized topic 'camping'. Further, the electronic device 300 categorizes existing image I5 and the new image I15 under the new personalized topic 'food and drinks'. Still further, the electronic device 300 categorizes existing image I12 and the new image I16 under the new personalized topic 'boating'.

With the inclusion of new images namely, I17, and I18, the electronic device 300 forms two new personalized topics namely, 'beach driving', and 'sunset jumps' at a second hierarchical level of the personalized topic 'vacation outdoor' (i.e., at a sub-hierarchical level of the personalized topic 'fun on beach'. The electronic device 300 categorizes existing images I6 and the new image I17 under the new personalized topic 'beach driving'. Further, the electronic device 300 categorizes existing image I13 and the new image I18 under the new personalized topic 'sunset jumps'.

FIGS. 8A and 8B illustrate displaying images across a time period based on a touch gesture, in which the displayed images are categorized under a personalized topic according to various embodiments of the present disclosure.

Referring to FIGS. 8A and 8B, a plurality of personalized topics is displayed across the timeline. Each of the plurality of personalized topics includes a plurality of images. According to the disclosed method, the electronic device 300 provides a 2D-UI, via which the user may visualize the plurality of images, categorized under the plurality of personalized topics, across the timeline. The timeline depicted herein, as selected by the user, is January-April. The range of the timeline, i.e., January-April, is selectable by the user. The range can also be set by default by the electronic device 300. Alternatively, at the start of an application, a complete time period is displayed (e.g., January-December). Thereafter, according to the disclosed method, the electronic device may display stored images along the timeline.

According to the disclosed method, the electronic device 300 may generate, via the topic generator 404, the plurality of personalized topics. When the user selects the range of the timeline, the display 406 may display a screen including the plurality of personalized topics along the timeline. The generation of the personalized topics and the categorization of the images, stored in the electronic device 300, with the personalized topics are performed in the offline mode or online modes as discussed in FIG. 1A.

Referring to FIGS. 8A and 8B, the personalized topics displayed across the timeline are 'at beach', 'on trips', 'celebrations' and 'others'. Each image is represented by an (x, y) notation. The variable 'x' denotes the personalized topic under which the image is categorized, and the variable 'y' denotes the corresponding image number of the image with respect to the personalized topic. In an example, an image denoted by (2, 5) refers to a fifth image categorized under the personalized topic 'on trips'. Similarly, an image denoted by (4, 3) refers to a third image categorized under the personalized topic 'others'. The numbering of an image with respect to a personalized topic is based on the time at which the image was stored in the electronic device 300. In an example, an image represented by (1, 2) was stored earlier in comparison with an image denoted by (1, 3).

Referring to FIGS. 8A and 8B, each of the plurality of personalized topics along a timeline is displayed with indicia. In various embodiments, the indicia may be vertical lines displayed across the timeline for each of the plurality of the personalized topics. Variation in the indicia may indicate a number of images stored in the electronic device 300 in a time period across the timeline. In an embodiment, the variation in the indicia may be a density of the vertical lines in the time period across the timeline. A higher density (e.g. a higher number) of vertical lines in the time period indicates that a greater number of images pertaining to the respective personalized topics have been stored in the time period, whereas a lower density (e.g., a lower number) of vertical lines in the time period indicates that a smaller number of images pertaining to the respective personalized topics have been stored in the time period. The indicia of the present disclosure is not limited to the description above. For example, vertical lines (indicia) may be displayed across the timeline in different colors based on the number of images stored in the electronic device 300 in a time period across the timeline (e.g., red for a high number of images, green for a low number of images). In another example, indicators other than vertical lines (e.g., dots) may be used as indicia, and the density of the dots in the time period across the timeline may be varied based on the number of images stored in the electronic device 300 in a time period across the timeline (e.g., high density of dots for a high number of images, low number of dots for a low number of images).

Referring to FIG. 8A, the user performs an input gesture (e.g., a touch gesture) with respect to the personalized topic 'at beach' for the time period of February. The gesture detector 408 detects the gesture. As depicted in FIG. 8B, after detection of the gesture by the gesture detector 408, according to the disclosed method, the display 406 may display the images which are categorized under the personalized topic 'at beach' and were included in the electronic device 300 (e.g., stored in, transferred to, captured by the electronic device 300) in February. According to an embodiment, after detection of the gesture by the gesture detector 408 (e.g., the touch gesture with respect to the personalized topic 'at beach' for the time period of February), the display 406 may display a pop-up window asking whether the user wishes to provide an additional input or select any of pre-set conditions list. The user may, for example, input 'Alan' in a text box displayed in the pop-up window or the user may select 'Alan' among pre-set conditions list, and the electronic device 300 may display images which are categorized under a combined condition (e.g., a personalized topic 'at beach'+'Alan') and were included in the electronic device 300 (e.g., stored in, transferred to, captured by the electronic device 300) in February.

It is to be noted that the same action can be performed in response to detecting another type of input gesture, for example, a hover input, a pinch open input, a motion gesture, a voice input, or the like. The display 406 may perform the above described action, an action different from the above described action, or any combination of actions, based on configurations of the display 406 and the gesture detection unit 408.

Figure 9:
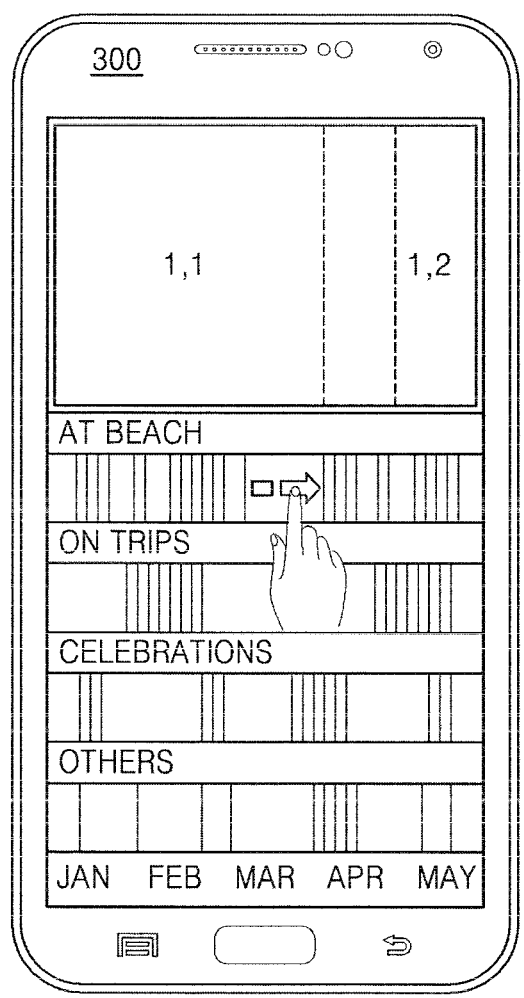
FIG. 9 illustrates displaying of images categorized under a personalized topic across a time period based on a swipe gesture according to an embodiment of the present disclosure.

FIG. 9 illustrates displaying of images categorized under a personalized topic across a time period based on a swipe gesture according to an embodiment of the present disclosure.

The image representation of FIG. 9 is similar to the image representation of FIGS. 8A and 8B. For the sake of brevity, similar elements between FIG. 9 and FIGS. 8A and 8B with respect to the image interpretation approach are not repeated here.

Referring to FIG. 9, initially the images categorized under the personalized topic 'at beach' are displayed. Initially the image denoted by (1, 1) is displayed. The user may input a swipe gesture on the personalized topic 'at beach' across a time period (e.g., a swipe gesture spanning from March to April on the display). The gesture detector 408 detects the gesture. After detection of the gesture, according to the disclosed method, the display 406 may display a subsequent image categorized under the personalized topic 'at beach' and corresponding to the time period, i.e., an image denoted by (1, 2).

FIGS. 10A and 10B illustrate displaying images categorized with personalized topics which are hierarchical levels of a personalized topic, across the timeline based on a pinch open gesture, according to various embodiments of the present disclosure.

Referring to FIG. 10A, the personalized topics displayed across the timeline are 'at beach', 'on trips', 'celebrations' and 'others'. The images categorized under the personalized topic 'at beach' are represented by a '1'. The images categorized under the personalized topic 'on trips' are represented by a '2'. The images categorized under the personalized topic 'celebrations' are represented by a '3'. The images categorized under the personalized topic 'others' are represented by a '4'.

Referring to FIG. 10A, the user performs a pinch open gesture on the personalized topic 'at beach'. The gesture detector 408 detects the gesture. As depicted in FIG. 10B, after detection of the pinch open gesture, according to the disclosed method, the display 406 may display the images categorized under personalized topics which are categorized under (i.e., belong to, or are initially associated with) the hierarchical levels of the personalized topic 'at beach'. The images categorized under personalized topics which belong to the hierarchical levels of the personalized topic 'at beach', are displayed in the timeline. In the example illustrate in FIG. 10B, the personalized topics which belong to the hierarchical levels of the personalized topic 'at beach' are namely, 'kids playing', 'jet skiing', 'horse riding', and 'others'.

Referring to FIG. 10B, each image is represented by a (x, y) notation. The variable 'y' denotes a personalized topic under which the image is categorized, and the personalized topic denoted by 'y' belongs to a hierarchical level of the personalized topic denoted by 'x'. In an example, an image denoted by (1, 1) refers to an image categorized under the personalized topic 'kids playing', which belongs to the hierarchical level of the personalized topic 'at beach'. Similarly, an image denoted by (1, 3) refers to an image categorized under the personalized topic 'horse riding' which belongs to the hierarchical level of the personalized topic 'at beach'.

Figure 11A:
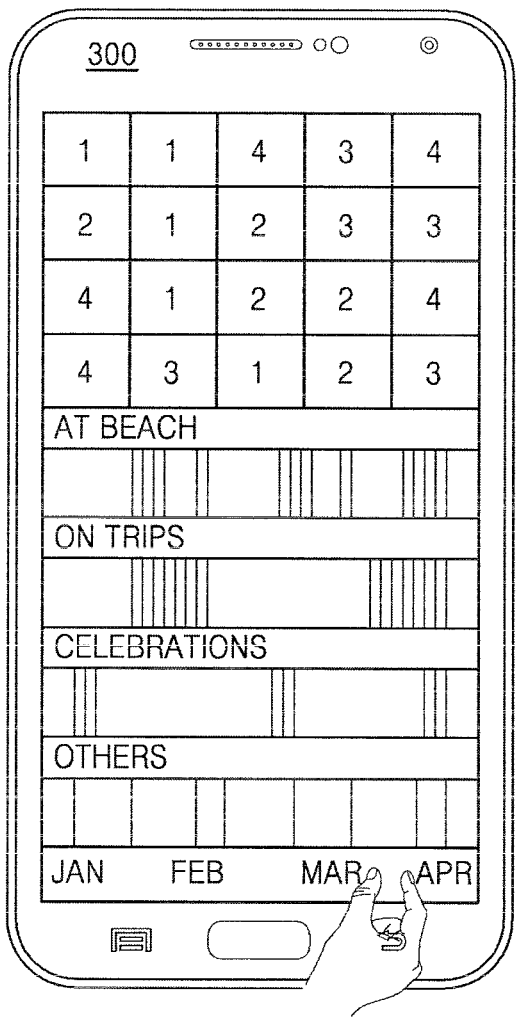
FIGS. 11A and 11B illustrate displaying images categorized under at least one hierarchical level of a personalized topic for each of the plurality of personalized topics, across a timeline, based on a pinch open gesture, according to various embodiments of the present disclosure.
Figure 11B:
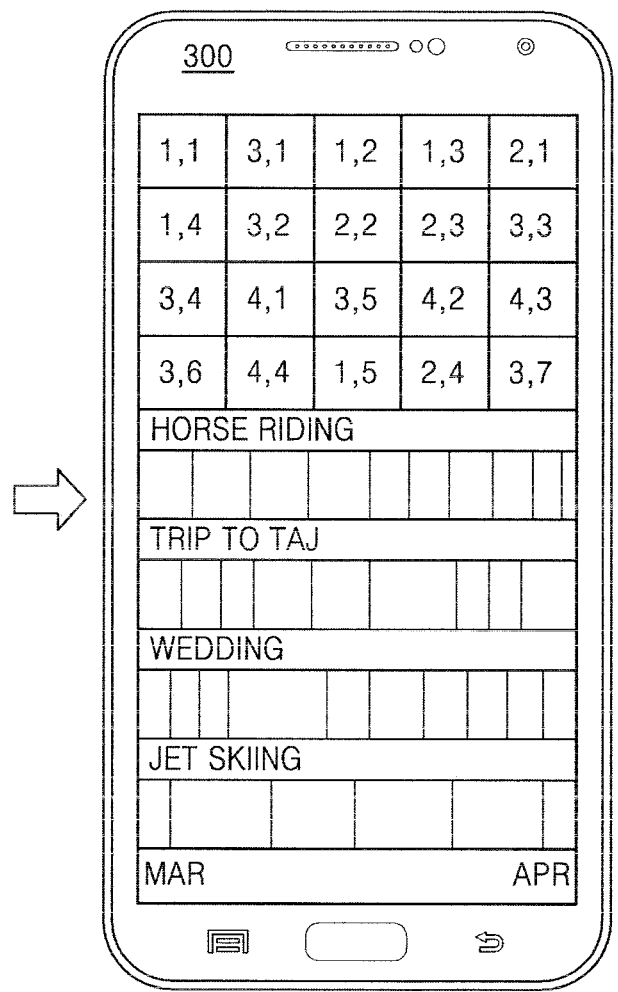

FIGS. 11A and 11B illustrate displaying images, categorized under (i.e., belonging to) at least one hierarchical level of a personalized topic for each of the plurality of personalized topics, across a timeline, based on a pinch open gesture, according to various embodiments of the present disclosure.

Referring to FIG. 11A, the personalized topics displayed across the timeline are 'at beach', 'on trips', 'celebrations' and 'others'. The images categorized under the personalized topic 'at beach' are represented by a '1'. The images categorized under the personalized topic 'on trips' are represented by a '2'. The images categorized under the personalized topic 'celebrations' are represented by a '3'. The images categorized under the personalized topic 'others' are represented by a '4'.

The image representation of FIGS. 11A and 11B are similar to the image representation of FIGS. 8A and 8B. For the sake of brevity, similar elements between FIGS. 11A and 11B and FIGS. 8A and 8B with respect to the image interpretation approach are not repeated here.

Referring to FIG. 11A, the user inputs a pinch open gesture with respect to a time period of March-April in the timeline January-April. The gesture detector 408 detects the gesture. After detection of the pinch open gesture, according to the disclosed method, the topic generator 404 may generate a plurality of personalized topics from a plurality of images included in the electronic device 300 along the time period March-April (e.g., based on images stored in, transferred to, captured by the electronic device 300 along the time period March-April). Thereafter, the electronic device 300 may display the plurality of personalized topics along a timeline March-April. According to the method, the display 406 may display the images.

Referring to FIG. 11B, the generated personalized topics are namely, 'horse riding', 'trip to taj', 'wedding', and 'jet skiing'. After detection of the pinch open gesture, according to the disclosed method, the display unit 406 may display the images categorized under the generated personalized topics along the time period March-April.

Figure 12A:
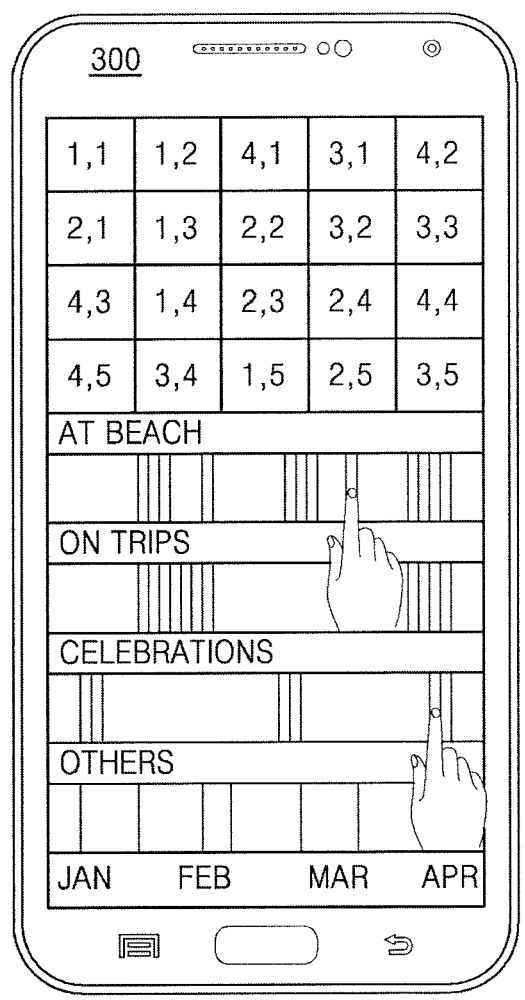

FIGS. 12A, 12B, and 12C illustrate displaying images categorized under at least two personalized topics, across a timeline, based on a pinch open gesture, according to various embodiments of the present disclosure.

Referring to FIGS. 12A to 12C, the personalized topics displayed across the timeline are 'at beach', 'on trips', 'celebrations' and 'others'. Each image is represented by a (x, y) notation. The variable 'x' denotes the personalized topic under which the image is categorized, and the variable 'y' denotes the corresponding image number of the image with respect to the personalized topic.

The images categorized under the personalized topic 'at beach' are represented by (1, y). The images categorized under the personalized topic 'on trips' are represented by (2, y). The images categorized under the personalized topic 'celebrations' are represented by (3, y). The images categorized under the personalized topic 'others' are represented by (4, y).

In an example, an image denoted by (4, 1) refers to first image categorized under the personalized topic 'others' Similarly, an image denoted by (3, 3) refers to a third image categorized under the personalized topic 'celebrations'. The numbering of an image with respect to a personalized topic is based on the time at which the image was stored in the electronic device 300.

Referring to FIG. 12A, the user performs input gestures with respect to two personalized topics, i.e., 'at beach' and 'celebrations', along the timeline January-April. According to the disclosed method, the gesture detector 408 may detect the gestures. In an embodiment, the gestures may be touch inputs, such as a double-tap input or a long press input. Thereafter, as depicted in FIG. 12B, the user performs pinch open gestures with respect to the two personalized topics, i.e., 'at beach' and 'celebrations'. The pinch open gestures entered with respect to the two personalized topics are detected by the gesture detector 408.

Referring to FIG. 12C, after detection of the pinch open gesture, according to the disclosed method, the topic generator 404 may further or newly categorize the images, initially categorized under the personalized topics namely, 'at beach' and 'celebrations', under a personalized topic 'eating with friends'. The further or new categorization is based on the existence of images in the personalized topics namely, 'at beach' and 'celebrations', which can be utilized by the feature extractor 402 and the topic generator 404, for categorization under the personalized topic 'eating with friends'. The personalized topic 'eating with friends' is a hierarchical level personalized topic of the personalized topics 'at beach' and 'celebrations' (i.e., the personalized topic 'eating with friends' is a personalized topic located at respective hierarchical levels of the personalized topics 'at beach' and 'celebrations'). The feature extractor 402 associates tags with images having identified features relevant to a particular type of celebration at the beach. The topic generator 404 categorizes the images with the personalized topic 'eating with friends' based on the topic learning of the images which are categorized under the two personalized topics namely, 'at beach' and 'celebrations'. Thereafter, the topic generator 404 categorizes the corresponding images under the personalized topic 'eating with friends'. According to the disclosed method, once the images are categorized under the personalized topic 'eating with friends', the display 406 may display the images categorized under the personalized topic 'eating with friends'. That is, the new personalized topic 'eating with friends' may include images that are under both hierarchical personalized topics 'at beach' and 'celebrations'.

Figure 13A:
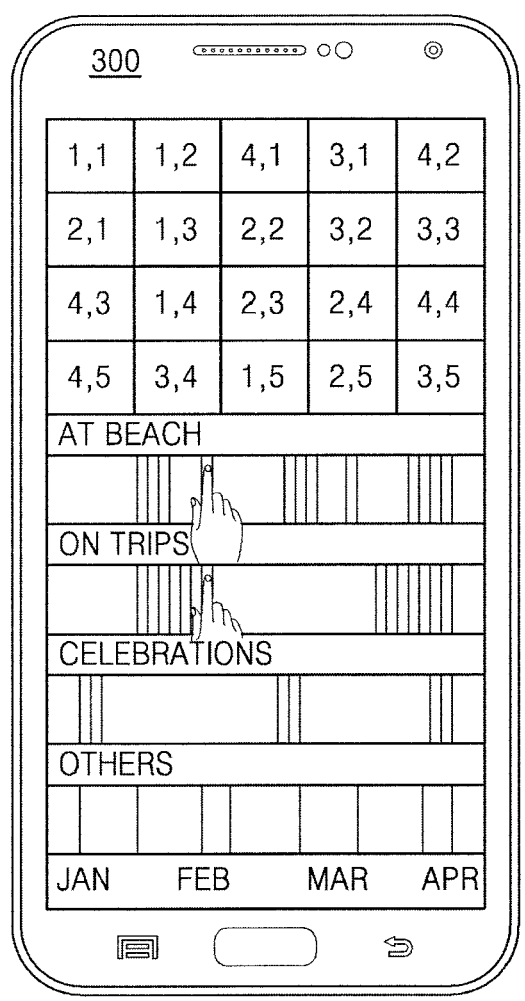

FIGS. 13A, 13B, and 13C illustrate displaying images categorized under a new personalized topic, in which the new personalized topic includes images categorized under two personalized topics according to various embodiments of the present disclosure.

The image representation of FIGS. 13A, 13B, and 13C is similar to the image representation of FIGS. 12A, 12B, and 12C. For the sake of brevity, similar elements between FIGS. 13A, 13B, and 13C and FIGS. 12A, 12B, and 12C with respect to the image interpretation approach is not repeated here. However, in FIG. 13C the images categorized under the personalized topic 'vacation' are represented by (1, y), and the images categorized under the personalized topic 'wedding' are represented by (2, y).

Referring to FIG. 13A, the user inputs gestures with respect to two personalized topics, i.e., 'at beach' and 'on trips', along the timeline January-April. According to the disclosed method, the gesture detector 408 may detect the gestures. In an embodiment, the gestures may be touch inputs such as a double-tap input or a long press input. Thereafter, as depicted in FIG. 13B, the user performs pinch gestures on the two personalized topics, i.e., 'at beach' and 'on trips'. The pinch gestures entered with respect to the two personalized topics are detected by the gesture detector 408.

Referring to FIG. 13C, after detection of the pinch gesture, the topic generator 404 may categorize images initially categorized under the two personalized topics 'at beach' and 'on trips', under a new personalized topic 'vacation'. The generation of the new personalized topic 'vacation' is based on existing hierarchical level personalized topics corresponding to the personalized topics, namely, hierarchical level personalized topics corresponding to 'at beach' and 'on trips'. Thus, the personalized topic 'vacation' includes images initially categorized under the hierarchical level personalized topics of the personalized topic 'at beach' and images initially categorized under the hierarchical level personalized topics of the personalized topic 'on trips'. Another personalized topic 'wedding' is generated.

According to the disclosed method, once the images initially categorized under the personalized topics 'at beach' and 'on trips' are categorized under the personalized topic 'vacation', the display 406 may display the images categorized under the personalized topic 'vacation'.

Figure 14:
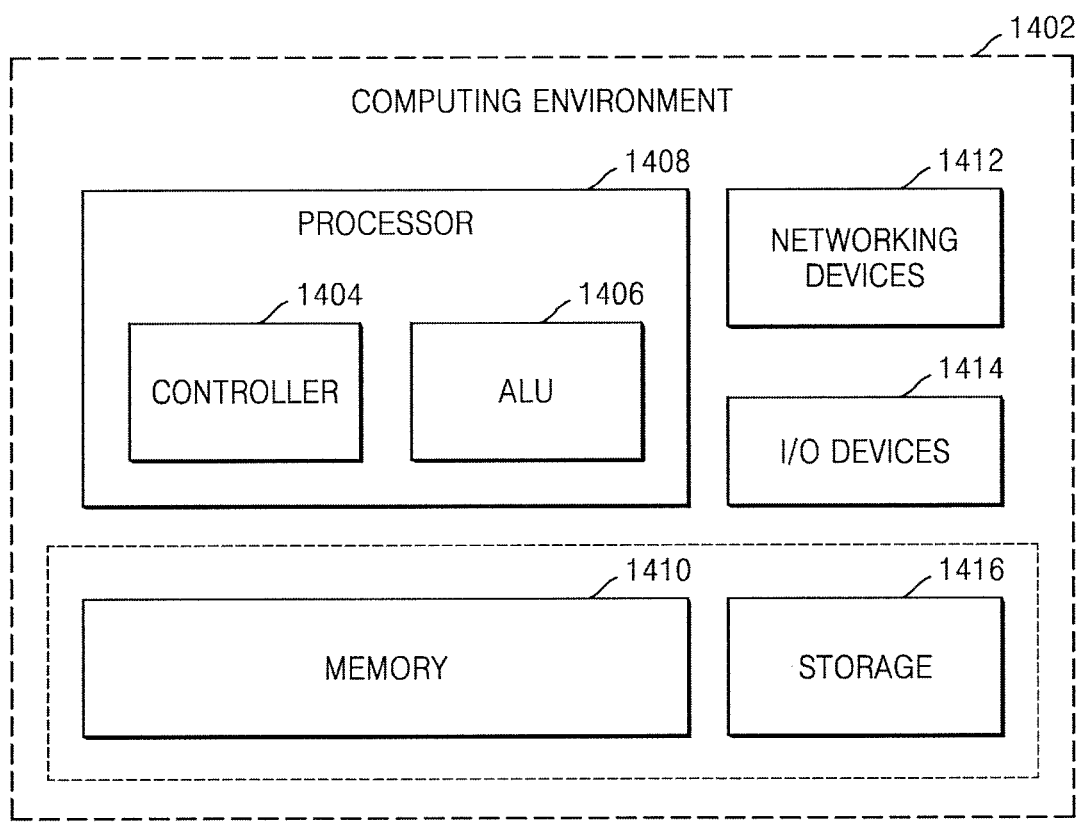
FIG. 14 illustrates a computing environment implementing the disclosed method of displaying images in a multi-dimensional mode based on personalized topics according to an embodiment of the present disclosure.

FIG. 14 illustrates a computing environment implementing the disclosed method of displaying images in a multi-dimensional mode based on personalized topics according to an embodiment of the present disclosure.

Referring to FIG. 14, the computing environment 1402 may include at least one processor 1408 equipped with a controller 1404 and an arithmetic logic unit (ALU) 1406, a memory 1410, a storage 1416, one or more networking devices, 1412 and one or more input/output (I/O) devices 1414. The processor 1408 is responsible for processing the instructions of the technique. The processor 1408 may process the instructions based on commands received from the controller 1404. Further, any logical and mathematics operations involved in the execution of the instructions may be computed with the help of the ALU 1406.

The overall computing environment 1402 can be composed of multiple homogeneous and/or heterogeneous cores, multiple central processing units (CPUs) of different kinds, special media and other accelerators. The processor 1408 is responsible for processing the instructions of the technique. Further, the plurality of processor 1408 may be located on a single chip or over multiple chips.

The technique comprising of instructions and codes required for the implementation are stored in either the memory 1410 or the storage 1416 or both. At the time of execution, the instructions may be fetched from the corresponding memory 1410 or storage 1416, and executed by the processor 1408.

In case of any hardware implementations various networking devices 1412 or external I/O devices 1414 may be connected to the computing environment to support the implementation through the networking unit and the I/O device unit.

The embodiments disclosed herein can be implemented through at least one software program running on at least one hardware device and performing network management functions to control the elements. The elements shown in the FIGS. 1A through 14 include blocks which can be at least one of a hardware device, or a combination of hardware device and software module.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of displaying images in a multi-dimensional mode based on personalized topics, the method comprising:
    generating, by an electronic device, a plurality of personalized topics based on a plurality of images stored in the electronic device across a predetermined time period;
    displaying, by the electronic device, the plurality of personalized topics and density indicia indicating a number of the images corresponding to each of the plurality of personalized topics along a timeline; and
    displaying, by the electronic device, a portion of the plurality of images, each image of the portion of the plurality of images having a first label denoting a corresponding personalized topic, of the plurality of personalized topics, and a second label denoting a number of the image with respect to the corresponding personalized topic,
    wherein a configurable distance between at least two of the density indicia is varied to indicate a proximity between dates of images corresponding to the at least two of the density indicia, and
    wherein the generating of the plurality of personalized topics comprises generating each of the plurality of personalized topics by recognizing a visual feature contained in at least one image of the plurality of images, the recognizing performed without facial recognition.

2. The method of claim 1, wherein the generating of the plurality of personalized topics comprises generating each of the plurality of personalized topics based on tags associated with the images.

3. The method of claim 1, further comprising:
    monitoring, at an interval, whether at least one image is stored to the electronic device during a consecutive time period following the predetermined time period; and
    dynamically updating the plurality of personalized topics in response to identifying at least one image stored to the electronic device during the consecutive time period.

4. The method of claim 1, further comprising generating hierarchical level personalized topics for each of the plurality of personalized topics based on a user input on the density indicia indicating the number of the images corresponding to the each of the plurality of personalized topics along the timeline.

5. The method of claim 1, further comprising:
    detecting a touch gesture input with respect to a personalized topic included among the plurality of personalized topics and a time period included in the timeline; and
    displaying images categorized under the personalized topic and corresponding to the time period included in the timeline.

6. The method of claim 1, further comprising:
    detecting a swipe gesture input with respect to a personalized topic included among the plurality of personalized topics and a time period included in the timeline; and
    displaying images categorized under the personalized topic and corresponding to the time period included in the timeline.

7. The method of claim 4, further comprising:
    detecting a pinch open gesture input with respect to a personalized topic included among the plurality of personalized topics and a time period included in the timeline; and
    displaying, with respect to the personalized topic, images which correspond to the time period included in the timeline and are categorized under a hierarchical level personalized topic corresponding to the personalized topic.

8. The method of claim 1, further comprising:
    detecting a pinch open gesture input with respect to a time period included in the timeline;
    generating a plurality of additional personalized topics from a plurality of images included in the electronic device and corresponding to the time period included in the timeline; and
    displaying the plurality of additional personalized topics across the timeline.

9. The method of claim 1, further comprising:
    detecting a gesture input with respect to at least two personalized topics included among the plurality of personalized topics and a time period included in the timeline;
    detecting a first gesture input with respect to the at least two personalized topics and the time period included in the timeline;
    categorizing images associated with the at least two personalized topics under a hierarchical level personalized topic of the at least two personalized topics; and
    displaying the images categorized under the hierarchical level personalized topic.

10. The method of claim 1, further comprising:
    detecting a gesture input with respect to at least two personalized topics included among the plurality of personalized topics and a time period included in the timeline;
    detecting a second gesture input with respect to the at least two personalized topics and the time period included in the timeline;
    forming a personalized topic based on images categorized under the at least two personalized topics, wherein the forming includes identifying hierarchical level personalized topics of the at least two personalized topics; and
    displaying, from among the plurality of images, images categorized under the formed personalized topic.

11. An electronic device for displaying images in a multi-dimensional mode based on personalized topics, the electronic device comprising:

a memory; and at least one processor configured to:
generate a plurality of personalized topics based on a plurality of images stored in the memory across a predetermined time period, display the plurality of personalized topics and density indicia indicating a number of the images corresponding to each of the plurality of personalized topics along a timeline, and display a portion of the plurality of images, each image of the portion of the plurality of images having a first label denoting a corresponding personalized topic, of the plurality of personalized topics, and a second label denoting a number of the image with respect to the corresponding personalized topic, wherein a configurable distance between at least two of the density indicia is varied to indicate a proximity between dates of images corresponding to the at least two of the density indicia, and wherein the generating of the plurality of personalized topics comprises generating each of the plurality of personalized topics by recognizing a visual feature contained in at least one image of the plurality of images, the recognizing performed without facial recognition.

12. The electronic device of claim 11, wherein the at least one processor is further configured to:
monitor, at an interval, whether at least one image is stored to the memory during a consecutive time period following the predetermined time period, and dynamically update the plurality of personalized topics in response to identifying at least one image stored to the memory during the consecutive time period.

13. The electronic device of claim 11, wherein the at least one processor is further configured to generate hierarchical level personalized topics for each of the plurality of personalized topics based on a user input on the density indicia indicating the number of the images corresponding to the each of the plurality of personalized topics along the timeline.

14. The electronic device of claim 11, wherein the at least one processor is further configured to:
detect a touch gesture input with respect to a personalized topic included among the plurality of personalized topics and a time period included in the timeline, and display images categorized under the personalized topic and corresponding to the time period included in the timeline.

15. The electronic device of claim 11, wherein the at least one processor is further configured to:
detect a swipe gesture input with respect to a personalized topic included among the plurality of personalized topics and a time period included in the timeline, and display images categorized under the personalized topic and corresponding to the time period included in the timeline.

16. The electronic device of claim 11, wherein the at least one processor is further configured to:
detect a pinch open gesture input with respect to a personalized topic included among the plurality of personalized topics and a time period included in the timeline, and display, with respect to the personalized topic, images which correspond to the time period included in the timeline and are categorized under a hierarchical level personalized topic corresponding to the personalized topic.

17. The electronic device of claim 11, wherein the at least one processor is further configured to:
detect a pinch open gesture input with respect to a time period included in the timeline, generate a plurality of additional personalized topics from a plurality of images included in the electronic device and corresponding to the time period included in the timeline, and display the plurality of additional personalized topics across the timeline.

18. The electronic device of claim 11, wherein the at least one processor is further configured to:
detect a gesture input with respect to at least two personalized topics included among the plurality of personalized topics and a time period included in the timeline, detect a pinch open gesture input with respect to the at least two personalized topics and the time period included in the timeline, categorize images associated with the at least two personalized topics under a hierarchical level personalized topic of the at least two personalized topics, and display the images categorized under the hierarchical level personalized topic along the timeline.

19. The method of claim 1, further comprising:
detecting a swipe gesture input on the timeline; and changing the density indicia indicating the number of the images corresponding to the each of the plurality of personalized topics to be proportionate to a change of a time period included in the timeline.

20. The electronic device of claim 11, wherein the at least one processor is further configured to detect a swipe gesture input on the timeline, and change the density indicia indicating the number of the images corresponding to the each of the plurality of personalized topics to be proportionate to a change of a time period included in the timeline.

* * * * *